May 14, 1968  W. J. ZEHR  3,382,539

EXTRUSION DIE SHELL ADJUSTMENT

Filed Aug. 4, 1966

INVENTOR
WILLIAM J. ZEHR.
BY Joseph E. Kerwin
ATTORNEY

United States Patent Office 3,382,539
Patented May 14, 1968

3,382,539
EXTRUSION DIE SHELL ADJUSTMENT
William J. Zehr, Oak Lawn, Ill., assignor to Continental Can Company, Inc., New York, N.Y., a corporation of New York
Filed Aug. 4, 1966, Ser. No. 570,371
3 Claims. (Cl. 18—14)

ABSTRACT OF THE DISCLOSURE

An extrusion die having a die body and a die shell adjustably mounted thereon for controlling the wall thickness of the extrudate flowing through the die orifice. The die body and the die shell are formed with complementary spherical seats to permit relative universal movement therebetween. The die body is seated and held selectively positioned on the complementary spherical surface by a fastening member having a concave spherical surface which engages a convex spherical surface on the die shell.

---

Figure 1:
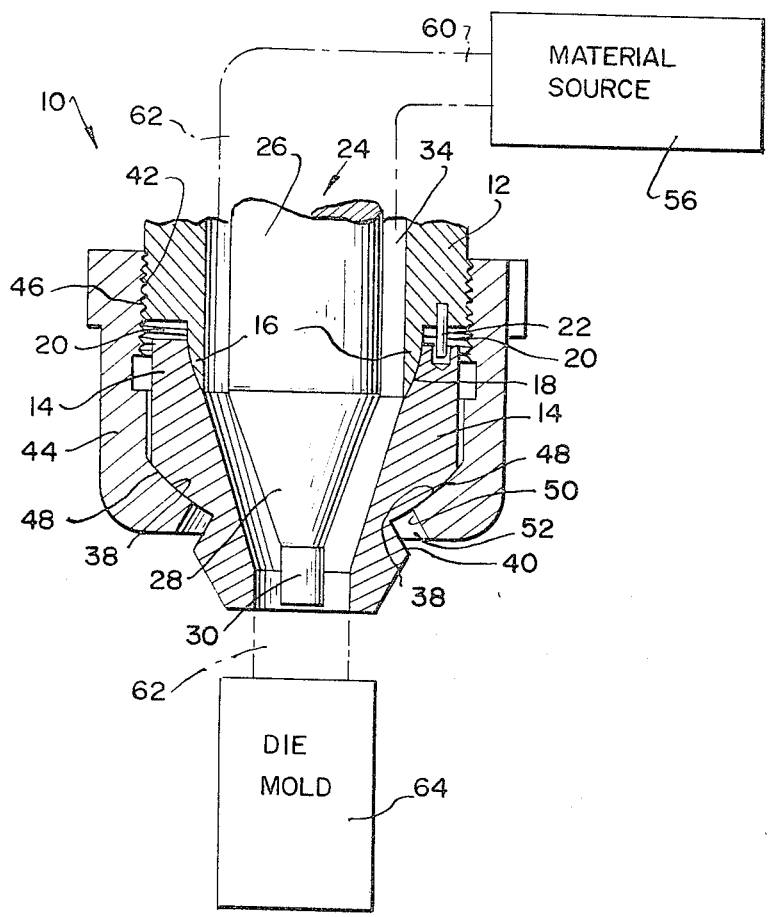

This invention relates to extrusion dies and, more particularly, to extrusion dies having adjustable die shells for controlling the wall thickness of an extrudate flowing therethrough.

In an extrusion die structure, the thickness of the wall of an extrudate, such as a tube of plastic, commonly known as a parison, is determined by the space left between the die shell and the core positioned within the shell in a usually concentric relationship therewith. Practically all extrusion dies are provided with means for facilitating the concentricity adjustment of the shell or of the core. This is necessary because of flow anomalies in the plastic which do not necessarily provide a uniform tube wall from a perfectly concentric shell and core. Heretofore, the parison thickness control had been effected by shifting the extrusion die shell with four screws in quadrature with the shell clamped against the flat bottom of the die body. The main disadvantage of this arrangement lies in the fact that a shift in any direction except that of a screw centerline, requires that all four screws be adjusted in varying amounts. The necessary adjustment of four screws not only causes a substantial machine down-time and general delay in production, but also, makes the provision of a uniform wall thickness of the parison extremely difficult.

Another disadvantage of the above arrangement includes the formation of a shoulder in the passage through which the extrudate is flowing when an adjustment of the shell is made. Since the die shell is connected to a die body located above the shell, a movement of the shell misregisters the existing connection and forms a shoulder which destroys the uniformity of the passage and causes portions of the extrudate to adhere to the shoulder.

A leakage of the extrudate along the connection between the die body and the die shell is a further disadvantage of the existing arrangement. Since the die shell must be movable, but also must be secured to the die body for support, it is extremely difficult to provide a connection which allows a movement of the shell and yet is tight enough to prevent the entry of the extrudate therein and to cause its leakage therethrough.

A still further disadvantage is encountered in the dismantling of the die, which must be accomplished while the plastic is heated to a temperature injurious to the hands of the operator, as the existing arrangement does not provide for quick dismantling means.

Therefore, there exists a need for an adjustable extrusion die which has a simple adjustment feature to provide for an adjustment at the exact point where it is necessary, without requiring an excessive machine down-time and which eliminates the above-recited disadvantages of the existing arrangement.

The principal object of this invention is to provide an extrusion die having an adjustable shell to control the thickness of the wall of the extrudate at the exact point where the adjustment is needed.

Another object of this invention is to provide an extrusion die shell adjustment which does not require a manipulation of several screws in order to attain proper wall thickness of the extrudate.

Still another object of this invention is to provide an extrusion die shell adjustment which requires but a minimum of machine down-time for adjustment.

Yet another object of this invention is to provide an adjustable extrusion die which incorporates a feature to easily adjust the die which incorporates a feature to easily adjust the die shell and to provide accurate control of the wall thickness of the extrudate.

Further object of this invention is to eliminate the leakage of extrudate along the line connecting the die shell and the die body.

Still further object of this invention is to eliminate the formation of an undesirable shoulder between the die shell and the die body when the shell is moved in an adjusting operation.

Yet further object of this invention is to provide an extrusion die having an adjustable shell which die can be safely disassembled in a minimum amount of time.

Figure 2:
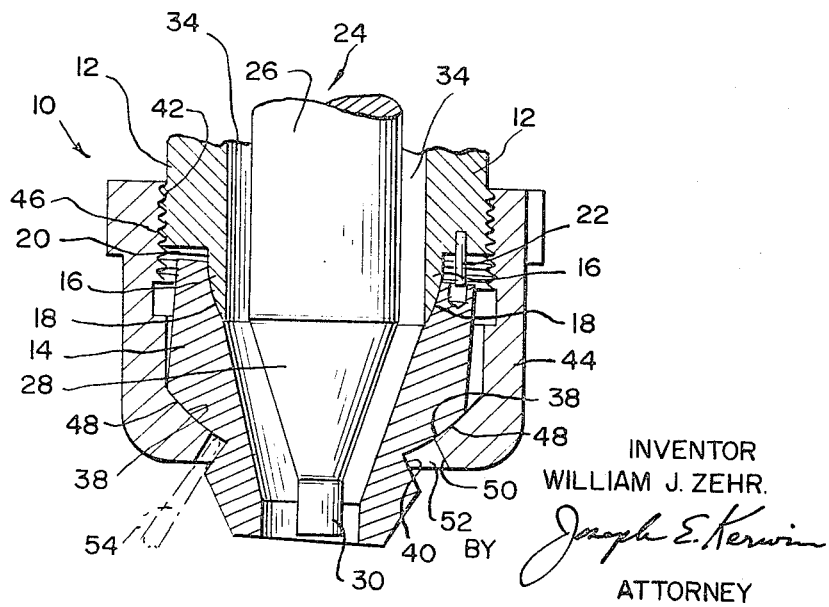

Further objects and advantages will become apparent from the following detailed description taken in connection with the accompanying drawing in which, FIG. 1 is an elevational view partly in section of a portion of an adjustable extrusion die embodying the present invention; and FIG. 2 is an elevational view partly in section similar to FIG. 1, but showing the shell after an adjustment whereby the shell is no longer concentric with the core.

While this invention is susceptible of embodiment in many different forms, there is shown in the drawing and will herein be described in detail an embodiment of the invention with the understanding that the present disclosure is to be considered as an exemplification of the principals of the invention and is not intended to limit the invention to the embodiment illustrated. The scope of the invention will be pointed out in the appended claims.

Generally, this invention discloses a stationary core concentrically positioned within a stationary die body and extending within an adjustable die shell. The lower interior portion of the die body is provided with an extension formed integrally therewith and having a curved spherical sealing surface, the lower part of which is in contact with a curved upper surface of the die shell. The die shell is provided with an exterior space for the insertion of a hand tool. Thus, when the die shell is moved by the exertion of a force on the hand tool inserted into the space, the shell shifts on the sealing surface either enlarging or reducing a space between a sector of the shell and the core. This space represents a wall thickness of a plastic tube, of extrudate, flowing therethrough. The adjustment of the shell controls the thickness of the wall of such a plastic tube. An outer ring, threadably secured to the die body and frictionally contacting the die shell, holds the die structure together.

Referring now to the drawing, more specifically to FIG. 1, there is shown a portion of a structure comprising an adjustable shell extrusion die generally designated 10. At the upper segment of this structure there is provided a hollow stationary die body 12 generally having a substantially cylindrical configuration. An adjustable hollow die shell 14 is situated below the die body 12 and is provided with a substantial interior taper so that the largest inside diameter of the shell is at its end adjacent the die body 12. The lower interior portion of the die body 12 is provided with an extension 16 formed integrally therewith and having a curved spherical sealing surface 18. An upper part of an interior wall of the die shell 14 is provided with a curved, or internal coincave, surface adapted to engage the surface 18 of the extension 16 of the die body 12. Thus the extension 16 is located between the die body 12 and the die shell 14. Since the die shell 14 is movable, as hereafter explained, there is provided a space 20 between a top of the die shell 14 and a bottom of the die body 12. To insure that the parts retain their proper respective positions during the assembly and subsequent adjustments of the die 10, some conventional holding means 22 is inserted between the die body 12 and the shell 14 and situated in a perpendicular relationship to the space 20.

A stationary core 24, having a substantially cylindrical upper region 26, a frusto-conical middle region 28, and a cylindrical lower region 30, is positioned within the body 12 and the shell 14 in a concentric relationship therewith. The upper region 26 of the core 24 is equally spaced from the walls of the die body 12 to provide an annular space, or passage, 34 therebetween for the purpose to be explained later. The middle region 28 of the core 24 is initially concentric and spaced-apart from the interior walls of the die shell 14. The spacing of the middle region 28 of the core 24 within the die shell 14 provides for a continuation of the passage 34 in a downward direction. The lower region 30 of the core 24 is positioned within the lower extremity of the die shell 14 and spaced-apart therefrom so that the passage 34 is continued along the entire length of the core 24. A segment of an external wall of the die shell 14 has a spherical convex surface 38 extending upwardly from a shell shoulder 40 and concentric with the spherical sealing surface 18 of the extension 16.

To effect a proper movement of the shell 14, it is extremely important that the surface 38 be concentric with the surface 18.

A lower exterior segment of the die body 12 is provided with a plurality of threads 42. A retaining means, or member, such as an annular, substantially cylindrical, holding ring 44 having a threaded interior upper surface 46 is threadably secured to the die body 12 so that the threads 42 of the die body 12 and the threads 46 of the ring 44 are in a mating relationship. In its lower section the ring 44 has a concave spherical surface 48 which is concentric and in engagement with the convex spherical surface 38 of the die shell 14 and which extends in a downward direction to a shoulder 50 terminating the ring 44. The die 10 can be dismantled in the minimum amount of time by removing the holding ring 44. A conically annular space 52 is provided between the shoulder 40 of the shell 14 and the shoulder 50 of the holding ring 44. As best seen in FIG. 2, the space 52 is used for the insertion of a hand tool, such as a wedging tool, 54 which is used to move the die shell 14 in a desired manner as hereafter explained.

In the operation as viewed in FIG. 1, a material source, such as a conventional extruder indicated by a block 56, supplies plastic material 60, having a form of a solid plastic rod, to the extrusion die 10. The upper configuration (not shown) of the die 10 causes the plastic rod 60 to be formed into a hollow plastic tube, or extrudate, 62 which flows in the annular passage 34 of the die 10 surrounding the core 24. The flow anomalies in the plastic will not necessarily provide a uniform wall of the extrudate 62 from the perfectly concentric arrangement of the shell 14 and the core 24. Thus, to obtain an extrudate wall of a desired thickness, it becomes necessary to adjust and control the width of the space 34 between the core 24 and the die shell 14.

When it becomes apparent that the wall of the extrudate 62 is either too thin or too thick at a certain point, a hand tool 54, as shown in FIG. 2, is inserted into the annular space 52 at the exact point where the adjustment of the wall thickness is necessary. By the use of the tool 54 a pressure is exerted on the shoulder 40 of the die shell 14 or on the shoulder 50 of the ring 44 in order to move the die shell 14 either toward the core 24 thus reducing the passage 34 therebetween, or away therefrom so as to enlarge the passage 34. When the hand tool 54 is placed in operation and the die shell 14 is moved, the upper portion of the die shell 14, having a curved surface in engagement with the spherical surface 18 of the die body extension 16, shifts on said surface 18 without interrupting the continuous flow of the extrudate 62 through the passage 34.

Upon leaving the die 10, the extrudate 62, having walls of desired thickness, proceeds into a die mold, designated by a block 64, wherein it is formed into a desired shape corresponding to the configuration of the mold.

It can be observed, that the provision of the extension 16 eliminates any leakage of the extrudate 62 at the line of connection between the die body 12 and the die shell 14. Also, since the die shell 14 shifts on the spherical sealing surface 18 of the extension 16 when the shell 14 is moved, the formation of an undesirable shoulder between the die body 12 and the die shell 14 is eliminated.

The die shell 14 is formed with two separate, concentric, surfaces. A concave surface, in engagement with the sealing surface 18 of the extension 16, seals against the leakage of the extrudate 62 between the die body 12 and the die shell 14. The convex surface 38 rests against the surface 48 of the retaining ring 44. The ring 44 can be tightened to a point that still allows the shifting of the die shell 14 and yet precludes the leakage of the extrudate 62 at the sealing surface 18.

What is claimed is:

1. An extrusion die comprising a hollow stationary die body having a convex spherical surface, a hollow movable die shell having an internal concave spherical surface complementary to said die body convex spherical surface and an external convex spherical surface concentric with said internal concave spherical surface, a core extending through said die body and said die shell and defining an annular passage for the flow of extrudate therethrough, retaining means attached to said die body and having a concave spherical surface complementary to and supportingly engaging said die body external convex surface so that said die shell may be selectively turned between said retaining means spherical and said die body spherical surface to vary the width of said passage and for retaining said die shell in sealing engagement with said die body convex surface.

2. The invention as defined in claim 1 wherein said retaining means is threadably attached to said die body.

3. The invention as defined in claim 1 wherein said die shell is formed with a shoulder means and said retaining means is formed with a complementary shoulder means spaced from said die shell shoulder to provide a space therebetween adapted to receive a hand tool for exerting a force between said retaining means and said die shell to turn said die shell relative to said core and thereby change the width of said passage.

References Cited

UNITED STATES PATENTS

| | | |
|---|---|---|
| 830,201 | 9/1906 | Blondel. |
| 3,111,714 | 11/1963 | Branscum. |
| 3,184,792 | 5/1965 | Commisso. |
| 3,281,896 | 11/1966 | Meyer et al. |

WILLIAM J. STEPHENSON, *Primary Examiner.*